(No Model.) 4 Sheets—Sheet 1.

E. LOBECK.
SUGAR CANE TOP AND LEAF CUTTER.

No. 330,135. Patented Nov. 10, 1885.

WITNESSES:
Otto Berger
C. Sedgwick

INVENTOR:
E. Lobeck
BY Munn & Co
ATTORNEYS.

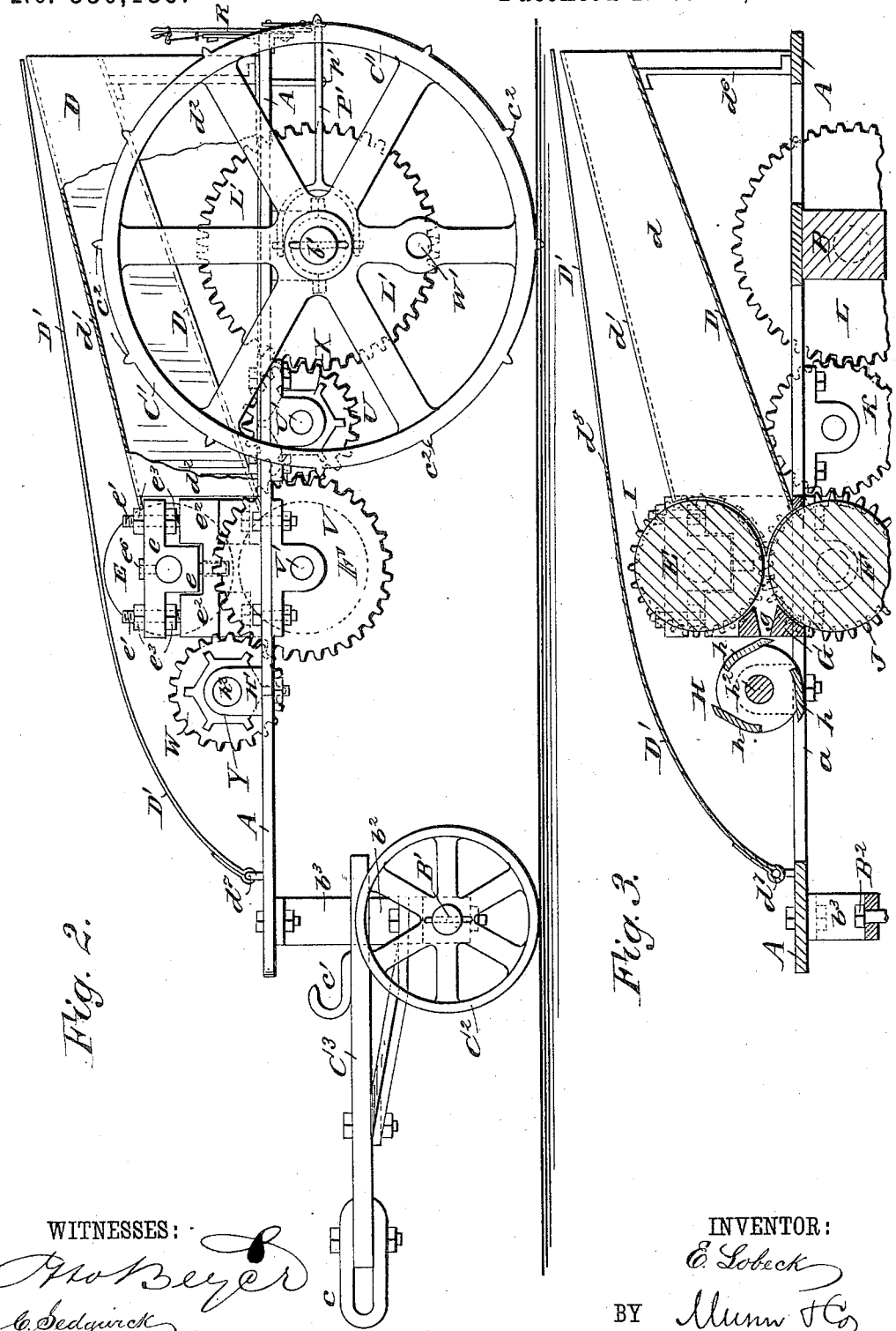

(No Model.) 4 Sheets—Sheet 3.
E. LOBECK.
SUGAR CANE TOP AND LEAF CUTTER.
No. 330,135. Patented Nov. 10, 1885.
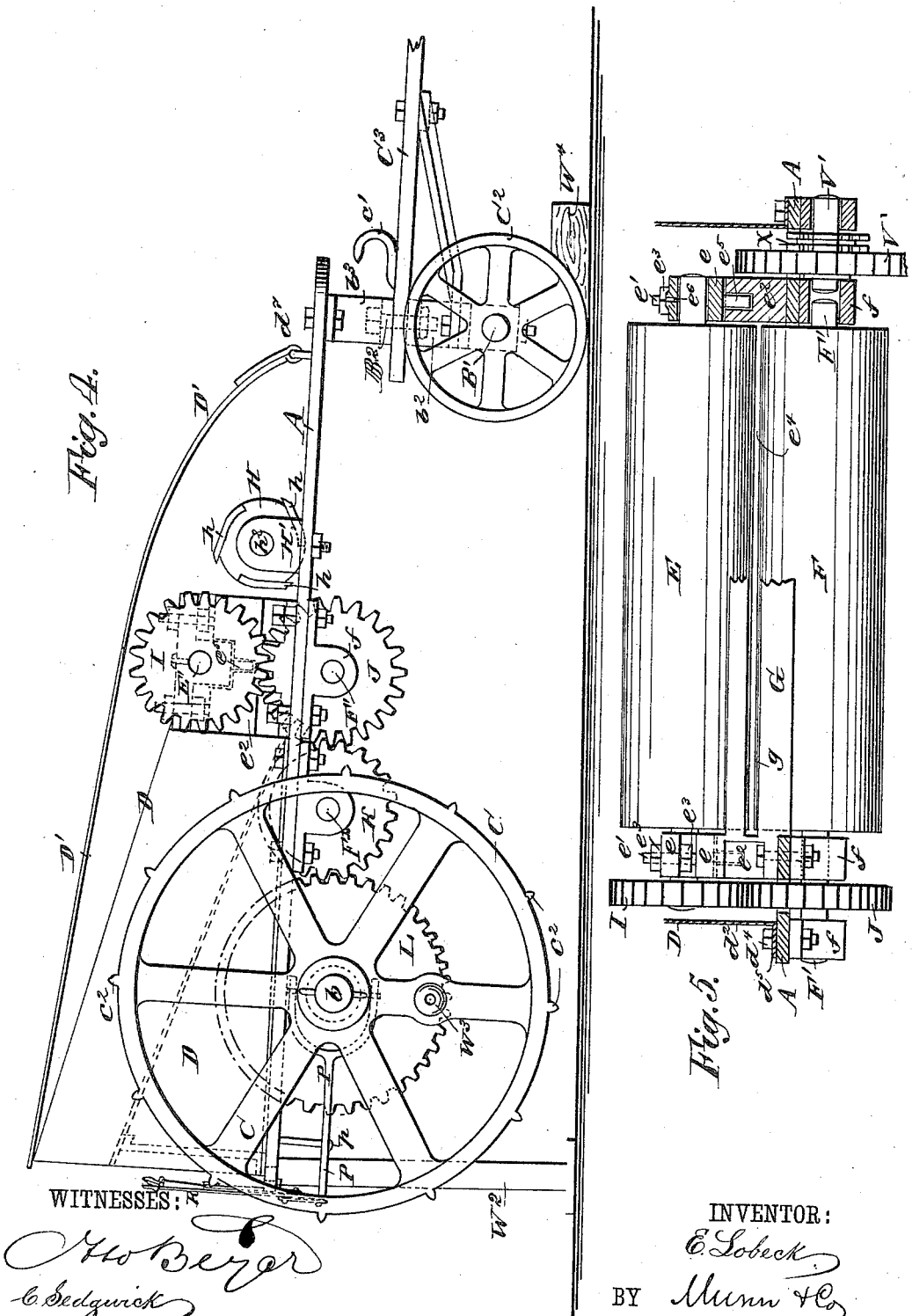
WITNESSES:
Ho Berger
C. Sedgwick
INVENTOR:
E. Lobeck
BY Munn & Co.
ATTORNEYS.

(No Model.) 4 Sheets—Sheet 4.

E. LOBECK.
SUGAR CANE TOP AND LEAF CUTTER.

No. 330,135. Patented Nov. 10, 1885.

WITNESSES:
Otto Beyer
C. Sedgwick

INVENTOR:
E. Lobeck
BY Munn & Co
ATTORNEYS.

UNITED STATES PATENT OFFICE.

EMILIO LOBECK, OF HAVANA, CUBA.

SUGAR-CANE TOP AND LEAF CUTTER.

SPECIFICATION forming part of Letters Patent No. 330,135, dated November 10, 1885.

Application filed October 10, 1884. Serial No. 145,152. (No model.) Patented in Cuba July 22, 1884, No. 107.

*To all whom it may concern:*

Be it known that I, EMILIO LOBECK, of Havana, Cuba, West Indies, have invented a new and Improved Machine for Cutting the Tops and Leaves of Sugar-Cane, of which the following is a full, clear, and exact description.

My invention relates to machines for cutting the tops and leaves of sugar-cane, which are stripped from the cane and left in the field; and the object of the invention is to provide a machine which will cut the cane tops and leaves into fine pieces and distribute them evenly over the ground in such condition to allow the land to be cultivated by plows and the cane tops and leaves to be used as a fertilizer.

The invention consists in a machine constructed with a feed-table, along which the cane tops and leaves are passed to feed-rollers, which carry them to knives which are rapidly worked to fine cut the tops and leaves which drop to the ground. The feed-rolls and knives are operated by gearing from an axle of the truck on which they are mounted, all as hereinafter fully described and claimed.

Reference is to be had to the accompanying drawings, forming part of this specification, in which similar letters of reference indicate corresponding parts in all the figures.

Figure 1:
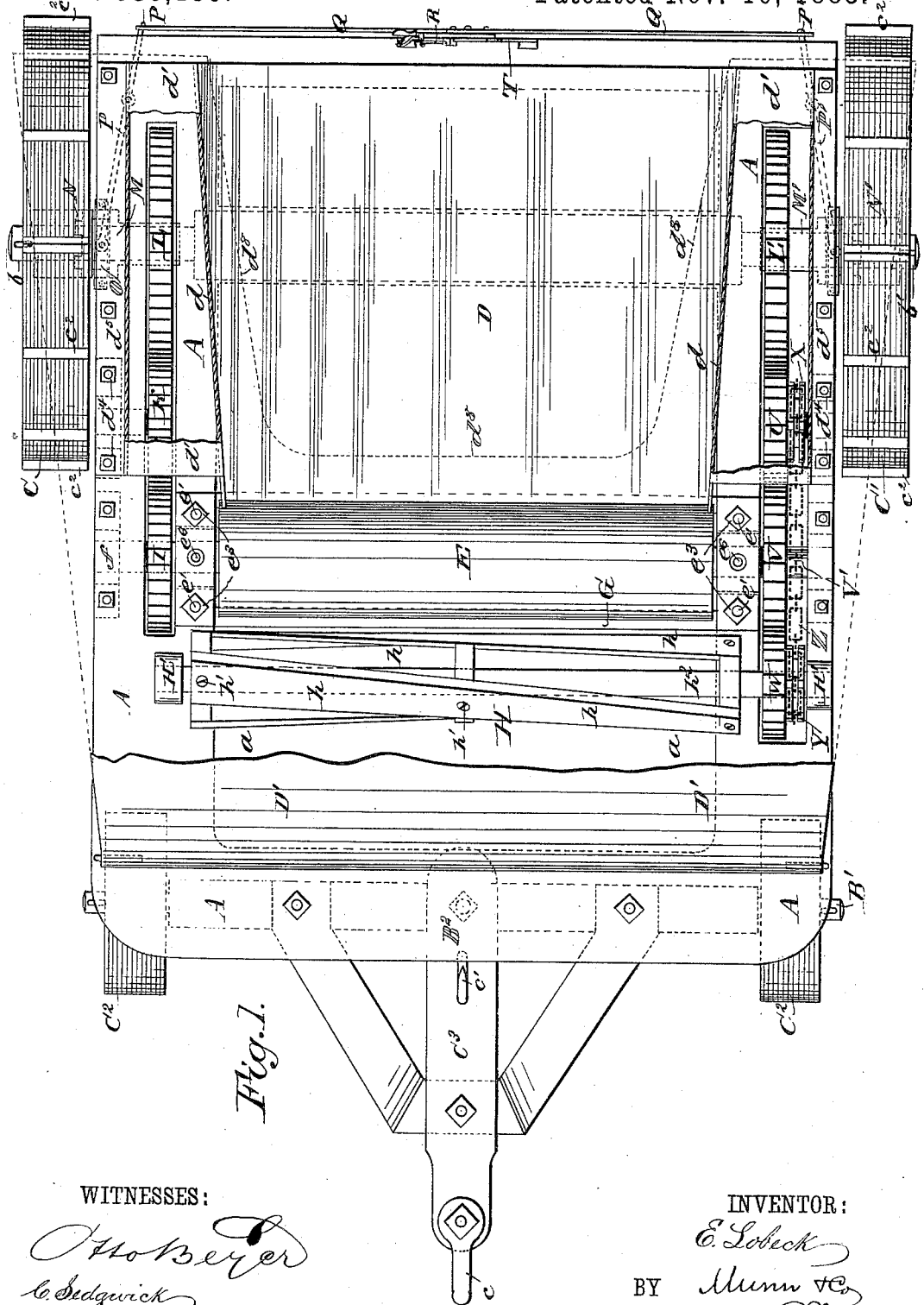
Figure 6:
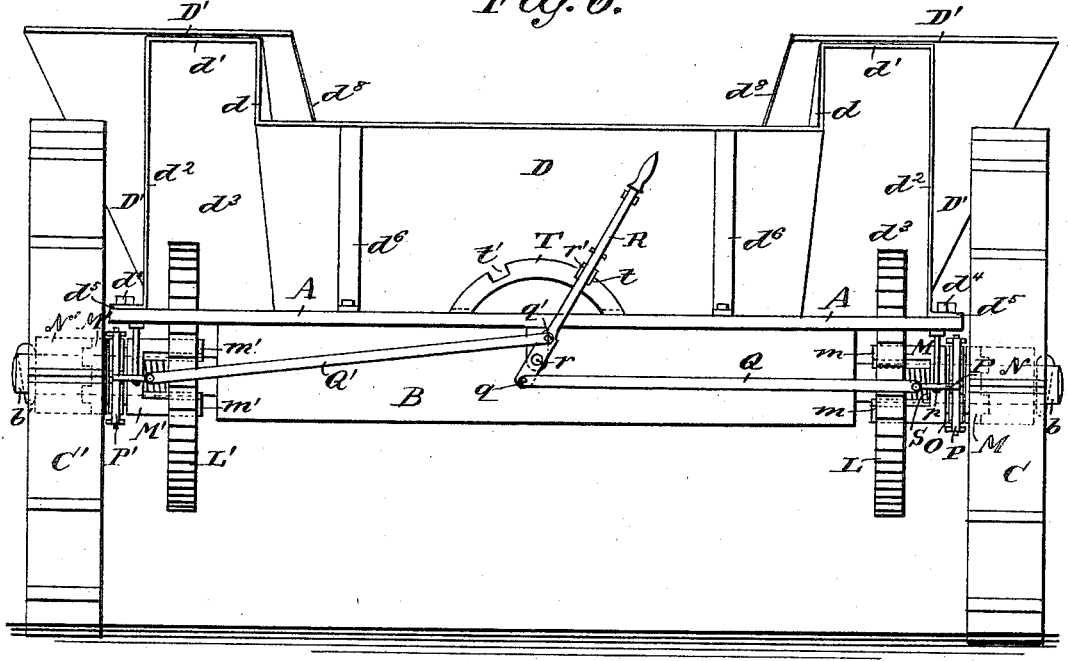
Figure 7:
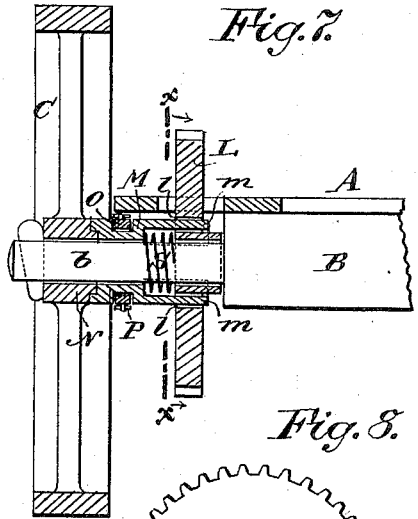
Figure 8:
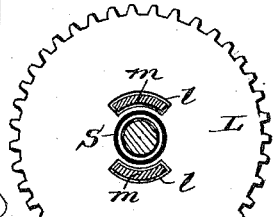

Figure 1 is a plan view of my improved machine, partly broken away. Fig. 2 is an elevation of the machine, partly broken away, and at the side from which the cutters are driven. Fig. 3 is a detail central longitudinal sectional elevation. Fig. 4 is an elevation of the machine at the side from which the feed-rolls are driven, and showing the machine adjusted to be driven by hand or steam power. Fig. 5 is a front elevation of the machine, with parts removed and other parts in transverse section. Fig. 6 is a rear view of the machine. Fig. 7 is a transverse sectional elevation showing one of the driving-wheels and its clutch mechanism; and Fig. 8 is a detail sectional elevation taken on the line $x\,x$, Fig. 7.

The letter A indicates the bed or platform of the machine, to which the hind axle, B, is rigidly attached in any suitable way. The main or driving wheels C C' of the machine are fitted loosely on the arms $b\,b'$ of the axle B, and connect with the feed-roll and knife-operating mechanisms by clutch devices hereinafter described. The forward wheels, $C^2$, are fitted loosely on the front axle, B', which is swiveled to the bed A by a king-bolt, $B^2$, which passes through plates $b^2\,b^3$, fixed to the axle and bed, respectively, and so that the front axle and wheels may swing either way. The tongue $C^3$ is attached to the forward running-gear of the truck, and has devices—such as a link, $c$, and hook $c'$—to which draft-animals, or steam or other motor, may be hitched for drawing the machine along the cane-field, or to and from the field.

The letter D indicates the inclined table, down which the cane tops and leaves are passed by hand or by any suitable means to the feed-rolls E F, which carry them through the slotted throat-piece G to the cutters H, from which the finely-cut cane tops and leaves drop through an opening, $a$, in the bed A to the ground. The lower feed-roll, F, is journaled in boxes $f$, fixed to the bed A, and the upper feed-roll, E, is journaled in boxes $e$, which are placed on screw-bolts $e'$, fixed in bed pieces or plates $e^2$, which are held to the bed or platform A. Nuts $e^3$ are screwed on the bolts $e'$ above and below the side lugs of the boxes $e$, whereby the boxes may be adjusted and held at any height to give any desired size of feed-space at $e^4$ between the feed-rolls E F to suit the condition of the cane tops and leaves to be cut. I provide the boxes $e$ with pins $e^5$, which fit loosely into holes in the bed-pieces $e^2$, and serve to guide the boxes and hold them more firmly, and holes $e^6$ are provided in the tops of the boxes $e$, to pass a lubricant to the journals of the upper feed-roll.

The throat-piece G is securely held to the bed A by bolts or otherwise, and so that its opening $g$, through which the cane tops and leaves pass to the cutters, will be directly behind or back of the opening $e^4$ between the feed-rolls. (See Figs. 3 and 5.)

The feed-rolls E F may be made of gum or of any other material adapted to carry the cane tops and leaves to the cutters.

The cutters may have any construction suitable for the work, and may be arranged to reciprocate vertically or horizontally; but I prefer to employ the revolving cutter-head H, which consists of suitable metallic head or frame, having the twisted or spiral knives or cutters $h$ fixed thereto in any suitable manner, as by screws $h'$. The cutter-head shaft $h^2$ is journaled in boxes H', bolted to the bed A. This style of cutter-head is strong and durable, and has a shearing action, and is capable of hard continuous work, such as is required in cutting the cane tops and leaves.

The feed-rolls E F have intermeshing gears I J, respectively fixed to their journals or shafts at one end, and an intermediate gear-wheel, K, fixed on the shaft $F^2$, meshes with the gear J, and also with a gear-wheel, L, which is placed loosely on the arm $b$ of axle B, and has one or more holes, $l$, through which an arm or arms, $m$, fast to a clutch-block, M, pass, for giving motion to the gear-wheel L when the clutch M (which also is loose on the axle-arm $b$) is engaged with a clutch-block, N, formed on the hub of the drive-wheel C.

To shift the clutch M either way, I employ a collar, O, which rests loosely in a circumferential groove of the clutch, and connects to one end of a yoke-lever, P, which is pivoted at $p$ to a suitable standard fixed to the bed A, and connects by its other end with a rod, Q, which is connected at $q$ to the lower end of a lever, R, and at one side of the fulcrum or pivot pin $r$ of the lever. A spring, S, placed on the axle-arm $b$, acts to force the clutch M into engagement with the clutch N when the clutch-shifting lever is unlatched from its catch-plate T.

When the clutches M N are engaged with each other, the feed-rolls will be operated from the wheel C, as the machine moves along the field, to pass to the cutters the cane tops and leaves fed along the table D, and when the clutches M N are disengaged the wheel C will turn on its axle without operating the feed-rolls, which is desirable when the machine is being moved on the road to and from the place of use.

To operate the cutter-head H from the drive-wheel C', I place loosely on the axle-arm $b'$ the gear-wheel L', which meshes with a gear-wheel, U, journaled to the bed A, and which in turn meshes with a gear-wheel, V, which is journaled by its short shaft V', to the bed A, and meshes with the gear-wheel W, fixed to the shaft $h^2$ of the cutter-head.

On the shaft U' of the gear-wheel U, and on the shaft $h^2$ of the cutter-head, are fixed, respectively, the chain-wheels X Y, around which an endless chain, Z, (shown in dotted lines in Fig. 1,) may be passed for driving the cutter-head by hand or other power applied to a crank, W', fixed on the wheel C', in which case the rear end of the machine will be raised by jacks $W^2$, to allow the wheels C C' to rotate clear of the ground, and the gear-wheel V will also in this case be removed from the bed A, so as not to mesh with the gears U W, and thus allow the cutter-head H to be rotated by the chain Z when it may be desired to do so. The wheel C also has a crank, as at $W^3$, for turning it by hand or other power for operating the feed-rolls to carry the cane tops and leaves to the knives.

When the machine is lifted at one end by the jacks $W^2$, chock-blocks $W^4$ should be placed under the forward wheels, $C^2$, to hold the machine steady while at work.

To throw the cutter-head-operating mechanism into and out of gear with the wheel C', I arrange with the wheel L' the clutch M' N', collar O', lever P', and connecting-rod Q', these parts being similar in construction and operation to the clutch M N, collar O, lever P, and rod Q of the feed-roll-operating mechanism, as above described.

I connect the rod Q' to the lever R at $q'$, so that when the lever is locked by its trip-bolt $r'$ in the notch $t$ of the catch-plate T, as in Fig. 6, the opposite clutch-blocks, M M', will be thrown into gear with the clutch-blocks N N', and when the lever R is locked by its trip-bolt $r'$ in the notch $t'$ of plate T the clutches at both sides of the machine will be thrown out of gear simultaneously, as will readily be understood.

I provide cross ribs or teeth $c^2$ on the rims of the drive-wheels, to give them a better hold on the ground for driving the feed-rolls and cutter-head as the machine moves over the field.

The arrangement of the gearing to allow the feed-rolls and cutter-head to be driven while the machine is jacked up or stationary, as above described, allows the machine to be stopped and worked by hand or other power at any place in the field where the cane tops and leaves lie too thickly on the ground to allow them all to be fed to the cutter-head, and the gearing also allows the machine to be used at any place for cutting fodder for animals.

To protect the rear gearing of the machine from the cane tops and leaves, I have made the feed-table D with upwardly-ranging side flanges $d\ d$, from which the sheet metal of the table is bent about at right angles at $d'$, and bent again vertically, as at $d^2$, to form at each side of the table the pockets $d^3$, in which the rear gears at each side of the machine rotate. The feed-table is held to the bed A by bolts $d^4$, passed through side flanges $d^5$ of the table, and by standards $d^6$, fixed to the table and the bed A, to support the rear end of the table at proper height to give it a desirable downward incline toward the feed-rolls.

To protect the feed-rolls, cutter-head, and front gearing of the machine from the cane tops and leaves, I provide a cover or guard plate, D', which is hinged at the front edge, as at $d^7$, to the bed A, to allow it to be thrown over on the hinge for access to the feed-rolls, cutter-head, and gearing, and the plate D' extends backward to rest on the raised side portions, $d'$, of the feed-table D. The guard-plate D' is cut away, as indicated by the dotted and full lines at $d^8$ in Figs. 1, 3, and 6, to allow the cane tops and leaves to be placed on the inclined feed-table and passed to the feed rolls and cutters.

It is evident that the construction of the feed-table D and guard-plate D', to cover the working parts of the machine, allow the cane tops and leaves to be passed quickly to the feed-rolls, by hand or other means, without danger of the tops and leaves falling upon and clogging the gearing.

When the cane-tops which have been stripped from the cane and the leaves which have fallen from the growing cane are left on the ground in their natural state, they form an obstruction to a considerable depth, and prevent the necessary absorption of rain by the land, and when the uncut tops and leaves decay and are dried by the heat they form a hard crust on the soil, which will not allow the cultivation of the land by plows, and to remove the tops and leaves before plowing is tedious and quite laborious and expensive, and when so removed the cane tops and leaves are lost as a fertilizer; hence the advantages of my invention are apparent, as the fine-cut tops and leaves may easily be plowed under and make an excellent fertilizer to enrich the soil for the next crop.

Having thus described my invention, I claim as new and desire to secure by Letters Patent—

1. In a machine for cutting the tops and leaves of sugar-cane, the combination, with the feed-rolls E F, gear-wheels I J K L, said gear-wheel L having slots $l$ through it, the axle B, and drive-wheel C, of a clutch consisting of a clutch-block, M, having arms $m$ on its inner face, that slide through the slots $l$ in the gear-wheel L, and a clutch-block, N, fixed to the wheel C, and means for engaging the blocks M N, substantially as shown and described.

2. In a machine for cutting the tops and leaves of sugar-cane, the feed-table D, made with raised portions forming side guards to the table and covers to the rear driving-gearing, substantially as shown and described.

3. In a machine for cutting the tops and leaves of sugar-cane, the guard-plate D', hinged at $d^7$ to the bed A and extending rearward over the feed-rolls, cutters, and their front driving-gearing, in combination with the feed-plate D, having surfaces $d'$, on which the plate D' rests, and said plate D' being cut away, as at $d^8$, all substantially as shown and described.

4. The machine herein described, comprising the platform A, axles B B', the wheels C C' C², the gears L L' on the axle B, clutches for connecting the said gears with the drive-wheels, the upper and lower feed-rollers, E F, the cutter H, journaled in front of said rollers, the throat-piece G, having a slot, $g$, in line with the shaft of the cutter and the space between the rollers, connecting mechanism between the gears L L' and said cutter and rollers, and the forward and downward inclined feed-table D, having raised side portions, $d'$, substantially as set forth.

EMILIO LOBECK.

Witnesses:
   Jos. A. Springer,
      *Consular Clerk.*
   Albert R. Betancourt.